(12) United States Patent
Dupont et al.

(10) Patent No.: US 11,203,912 B2
(45) Date of Patent: Dec. 21, 2021

(54) MECHANICAL FLOW ASSEMBLY

(71) Applicant: Schlumberger Technology Corporation, Sugar Land, TX (US)

(72) Inventors: Hugues Dupont, Abbeville (FR); Pierre-Yves Corre, Abbeville (FR); Stephane Metayer, Abbeville (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/020,883

(22) Filed: Sep. 15, 2020

(65) Prior Publication Data
US 2021/0079755 A1    Mar. 18, 2021

Related U.S. Application Data
(60) Provisional application No. 62/900,837, filed on Sep. 16, 2019.

(51) Int. Cl.
| | |
|---|---|
| *E21B 33/127* | (2006.01) |
| *F16L 55/136* | (2006.01) |
| *E21B 23/06* | (2006.01) |
| *E21B 33/124* | (2006.01) |

(52) U.S. Cl.
CPC ............ *E21B 33/127* (2013.01); *E21B 23/06* (2013.01); *F16L 55/136* (2013.01); *E21B 33/1243* (2013.01); *E21B 33/1277* (2013.01)

(58) Field of Classification Search
CPC .... E21B 33/12; E21B 33/127; E21B 33/1277; E21B 33/1243; E21B 23/06; F16L 55/136
See application file for complete search history.

(56) References Cited

U.S. PATENT DOCUMENTS

| | | | | |
|---|---|---|---|---|
| 2,397,419 | A * | 3/1946 | Granville | ................ E21B 41/00 |
| | | | | 166/68.5 |
| 3,134,441 | A * | 5/1964 | Adelbert | ............... E21B 33/127 |
| | | | | 277/333 |
| 3,743,457 | A * | 7/1973 | Cini | ...................... B29C 48/303 |
| | | | | 425/113 |
| 6,062,073 | A * | 5/2000 | Patton | ..................... E21B 23/02 |
| | | | | 166/100 |
| 8,695,717 | B2 | 4/2014 | Brennan, III et al. | |
| 9,097,107 | B2 | 8/2015 | Corre et al. | |
| 9,181,771 | B2 * | 11/2015 | Corre | .................... E21B 33/127 |
| 9,371,730 | B2 | 6/2016 | Corre et al. | |
| 9,551,202 | B2 | 1/2017 | Corre et al. | |
| 2007/0215348 | A1 * | 9/2007 | Corre | .................. E21B 33/1277 |
| | | | | 166/264 |
| 2009/0159278 | A1 * | 6/2009 | Corre | ...................... E21B 33/12 |
| | | | | 166/264 |
| 2009/0301715 | A1 * | 12/2009 | Corre | ...................... E21B 49/10 |
| | | | | 166/250.17 |

(Continued)

*Primary Examiner* — Yong-Suk (Philip) Ro

(57) ABSTRACT

Aspects of the present disclosure relate to an expandable packer assembly that includes a mechanical flow assembly. In some embodiments, the mechanical flow assembly includes a fluid arm that directs a flow of fluid into an expandable element to inflate the expandable element, and a support arm that provides support to the fluid arm during inflation of the expandable element. In some embodiments, the mechanical flow assembly is rotatably coupled to a piston and a packer conduit of the expandable element via linkages.

20 Claims, 8 Drawing Sheets

(56) References Cited

U.S. PATENT DOCUMENTS

2014/0131031 A1* 5/2014 Cody .................... E21B 43/086
                                                               166/179
2014/0374119 A1* 12/2014 Dewars ............... E21B 33/1243
                                                               166/373

* cited by examiner

MECHANICAL FLOW ASSEMBLY

CROSS REFERENCE

This application claims the benefit of U.S. Provision application No. 62/900,837, entitled "Mechanical Flow Assembly" filed Sep. 16, 2019, the disclosure of which is hereby incorporated herein by reference.

BACKGROUND

This disclosure relates generally to downhole tools and more specifically to techniques for deploying and/or actuating expandable packers.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Producing hydrocarbons from a wellbore drilled into a geological formation is a remarkably complex endeavor. During drilling operations, evaluations of the composition within the geological formation may be performed for various purposes, such as to locate hydrocarbon-producing formations and manage the production of hydrocarbons from these formations. To conduct formation evaluations, the drill string may include one or more drilling tools that test and/or sample the surrounding formation, or the drill string may be removed from the wellbore, and a wireline downhole tool may be deployed into the wellbore to test and/or sample the formation. These drilling tools and wireline downhole tools, as well as other wellbore tools conveyed on coiled tubing, drill pipe, casing or other conveyers, are also referred to herein as "downhole tools."

A downhole tool may include an inflatable packer for oil and gas operations such as wellbore testing and for cement assurance. In general, an inflatable packer has an inflatable bladder that may expand (e.g., inflate) a packer element to seal off and isolate a region within a wellbore for wellbore testing.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One embodiment of the present disclosure relates to a mechanical flow assembly. The mechanical flow assembly includes a first linkage rotatably coupled to a piston, wherein at least a portion of the first linkage is configured to flow a fluid. The mechanical flow assembly also includes a fluid arm coupled to the first linkage, wherein the fluid arm is configured to receive the fluid from the first linkage. Further, the mechanical flow assemblies includes a second linkage coupled to the fluid arm and rotatably coupled to a packer conduit, wherein the second linkage is configured to direct the fluid from the fluid arm toward an expandable element via the packer conduit, and wherein the expandable element is configured to inflate in response to receiving the fluid. Further still, the mechanical flow assembly includes a support arm coupled to the first linkage and the second linkage, wherein the support arm is configured to provide support to the fluid arm in response to inflation of the expandable element.

Another embodiment of the present disclosure relates to an expandable packer assembly for a downhole tool. The expandable packer assembly includes an expandable element configured to inflate in response to receiving a fluid via a packer conduit and configured to deflate in response to expelling the fluid via the packer conduit. The expandable packer assembly also includes a mechanical flow assembly fluidly coupled to the expandable element via the packer conduit, wherein the mechanical flow assembly is configured to extend and retract in response inflation and deflation of the expandable element, respectively. The mechanical flow assembly includes a first linkage rotatably coupled to the packer conduit, wherein at least a portion of the first linkage is configured to flow the fluid. The mechanical flow assembly also includes a fluid arm coupled to the first linkage, wherein the fluid arm is configured to flow the fluid. Further, the mechanical flow assembly includes a second linkage coupled to the fluid arm and rotatably coupled to a piston, wherein at least a portion of the second linkage is configured to flow the fluid. Further still, the mechanical flow assembly includes a support arm coupled to the first linkage and the second linkage, wherein the support arm is configured to provide support to the fluid arm in response to inflation of the expandable element, wherein the fluid arm and the support arm are configured to rotate with respect to the piston and the packer conduit in response to the inflation of the expandable element.

Another embodiment of the present disclosure relates to an expandable packer for a downhole tool. The expandable packer includes a mandrel configured to direct a flow of fluid. The expandable packer also includes an expandable element comprising a plurality of packer conduits, wherein the expandable element is configured to inflate in response to receiving the fluid via the plurality of packer conduits. Further, the expandable packer includes a plurality of mechanical flow assemblies fluidly coupled to the mandrel and the expandable element. Each mechanical flow assembly of the plurality of mechanical flow assemblies includes a first linkage rotatably coupled to a piston and fluidly coupled to the mandrel, wherein at least a portion of the first linkage is configured to receive the flow of fluid from the mandrel. Each mechanical flow assembly also includes a fluid arm coupled to the first linkage, wherein the fluid arm is configured to receive the fluid from the first linkage. Further, each mechanical flow assembly includes a second linkage coupled to the fluid arm and rotatably coupled to a packer conduit of the plurality of packer conduits, wherein the second linkage is configured to direct the flow of fluid from the fluid arm toward the expandable element via the packer conduit. Further still, each mechanical flow assembly includes a support arm coupled to the first linkage and the second linkage, wherein the support arm is configured to provide support to the fluid arm in response to inflation of the expandable element.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
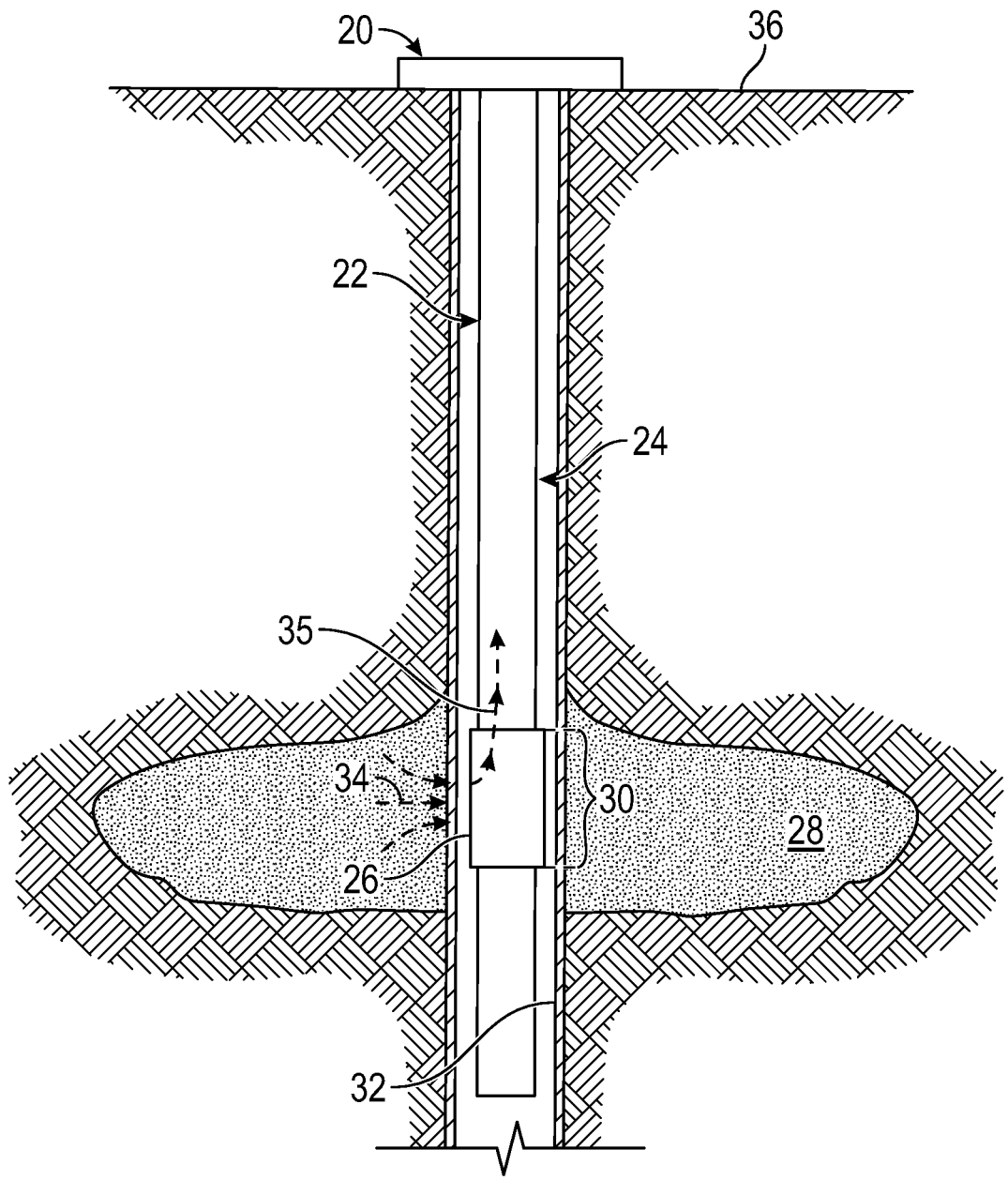
FIG. 1 is a schematic front elevation view of an embodiment of a well system having a an expandable packer through formation fluids may be collected, in accordance with an embodiment of the present disclosure.

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, "axial" and "axially" generally mean along or parallel to a central longitudinal axis (e.g., the central axis of a body or a port), while the terms "radial" and "radially" generally mean crosswise to the central longitudinal axis.

An expandable (e.g., flexible, elastic, inflatable) packer assembly in typical operation generally inflates (e.g., expands) to provide a seal between an isolated region (e.g., isolation zone) of a wellbore and the remaining portion of the wellbore. As discussed above, certain oil and gas operations, such as sampling, may be performed within the isolated region. In general, an expandable (e.g., inflatable) packer includes an expandable element (e.g., a bladder) that is selectively inflated by fluid delivery via a mandrel. The inflation causes the expandable element to extend radially outward, such that the expandable packer engages a wall of the wellbore (e.g., a surrounding casing or an open wellbore wall) to form the isolation zone (ie the zone of contact between the wall of the wellbore and the expandable element). Existing expandable packers may include spring-based assemblies used to facilitate inflation and deflation of the expandable element. Such spring-based assemblies may lack structural support, and due to the high expansion ratio of the expandable element, may not enable complete deflation of the expandable element over time. Additionally or alternatively, the spring-based assemblies may have a relatively low operating life, such that springs and/or other components are replaced frequently. Improving the reliability of the expandable packer assembly to inflate and deflate may reduce a likelihood of the expandable packer assembly getting stuck in the wellbore (e.g., due to insufficient deflation after expansion).

Accordingly, the present disclosure relates to an expandable packer assembly to be used as part of a downhole tool disposed in a wellbore. In general, the expandable packer assembly includes a mechanical flow assembly that provides fluid communication between the isolation zone where formation fluid is being retrieved and the flowlines in the downhole tool where pressure and flow rate are managed and monitored. Moreover, and as discussed in more detail herein, the mechanical flow assembly is configured to assist the expandable element in returning as close as possible to a fully deflated position. For example, the mechanical flow assembly may include linkages that are rotatably coupled to a piston. Each linkage may be mechanically coupled to a fluid arm that enables fluid to flow between the expandable element and a mandrel of the expandable packer assembly. Additionally, each linkage may be mechanically coupled to a support arm that reduces a load on the fluid arm, the linkages, and/or a joint rotatably coupling the linkages to the piston. In general, the piston guides movement of components of the mechanical flow assembly as the expandable element inflates, while maintaining fluid communication between the mandrel and the expandable element. Further, the piston guides the movement of the components of the mechanical flow assembly as the expandable element deflates and enables the inflatable element to return to the fully deflated position. In some embodiments, the expandable packer assembly includes a centralizer (e.g., a component having one or more grooves) that guides movement of the mechanical flow assembly and facilitates positioning the mechanical flow assembly in a retracted position. The mechanical flow assembly of the present disclosure may include enhanced structural components that improve the reliability and performance of the expandable packer assembly and enable movement of the expandable element between an inflated position and a deflated position.

With the foregoing in mind, FIG. 1 is a schematic of an embodiment of a well system 20 as deployed in a wellbore 22. The well system 20 includes a conveyance 24 employed to deliver at least one packer assembly 26 downhole. In many applications, the packer assembly 26 is deployed by conveyance 24 in the form of a wireline, but conveyance 24 may have other forms, including tubing strings, for other applications. In the illustrated embodiment, the packer assembly 26 is used to collect formation fluids from a surrounding formation 28. The packer assembly 26 is selectively expanded in a radially outward direction to seal across an expansion zone 30 with a surrounding wellbore wall 32, such as a surrounding casing or open wellbore wall. When the packer assembly 26 is expanded to seal against wellbore wall 32, formation fluids can flow into the packer assembly 26, as indicated by arrows 34. The formation fluids are then directed to a flowline, as represented by arrows 35. Fluid is first produced and rejected in the well during cleanup, while being analyzed. When contamination level is low enough, it can be decided to take sample in bottles contained in wireline tool. As described in detail below, the packer assembly 26 may include one or more mechanical flow assemblies that are configured to facilitate inflation and/or deflation of an expandable element of the packer assembly 26.

Figure 2:
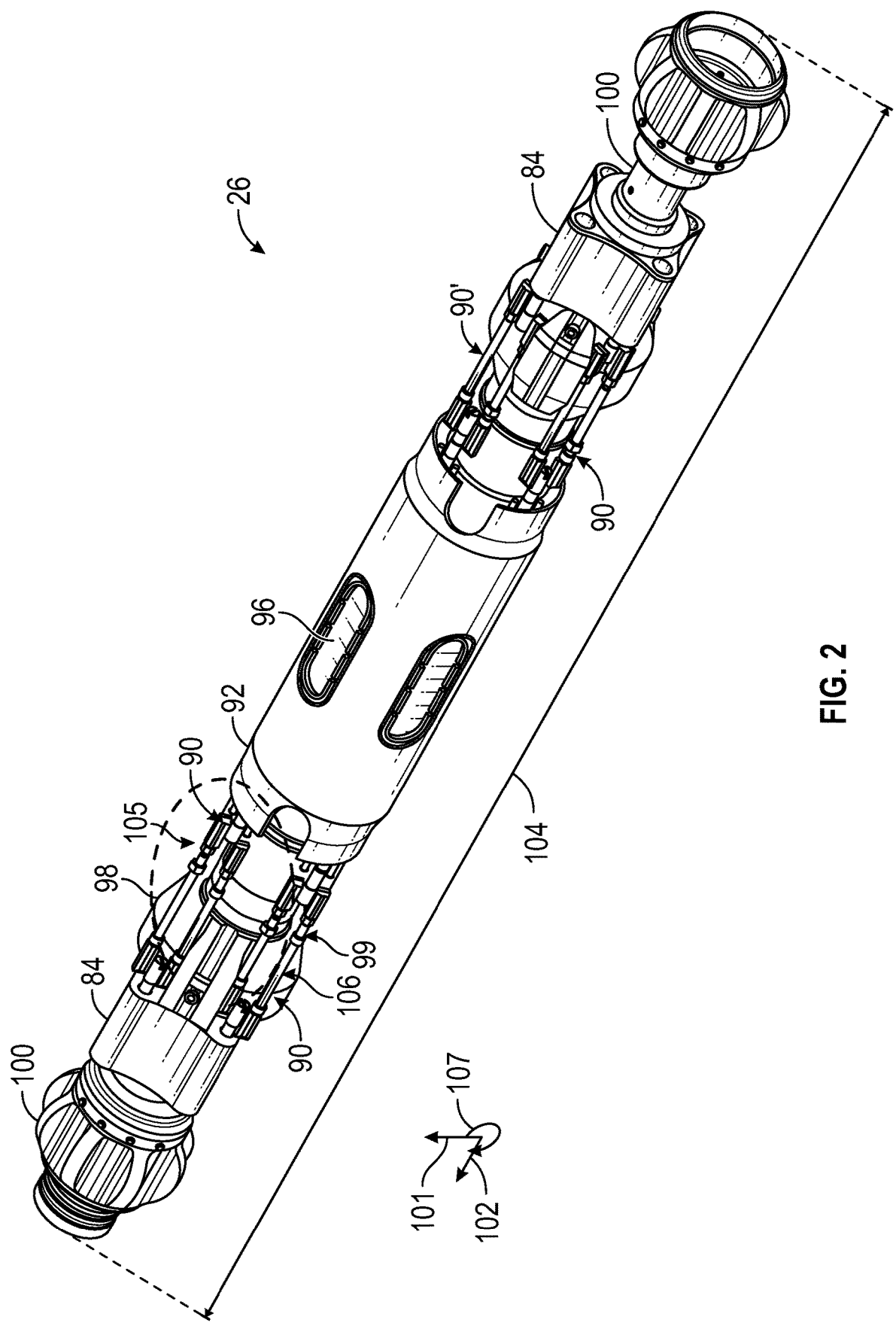
FIG. 2 is a perspective view of the expandable packer for use in the well system of FIG. 1, in accordance with an embodiment of the present disclosure.

With the foregoing in mind, FIG. 2 is a perspective view of the packer assembly 26 that may be deployed or conveyed within the wellbore 22 to isolate a region of the wellbore 22, in accordance with the present disclosure. As shown in the illustrated embodiment of FIG. 2, the packer assembly 26 includes mechanical flow assemblies 90, 90' that are fluidly coupled to an expandable element 92 (e.g., a bladder) and mechanically coupled to a piston housing 84. The expandable element 92 includes one or more ports 96 that may include sample and/or guard inlets to acquire and/or sample fluids from the geological formation 28. The piston housing 84 may include one or more chambers that are in a reduced pressure environment (e.g., vacuum), which are driven via the inflation and the deflation of the expandable element 92, as discussed in more detail with regard to FIG. 10.

The illustrated embodiment of the expandable packer assembly 48 also includes a centralizer 98, which includes one or more grooves 99 that facilitate movement of the mechanical flow assemblies 90 to facilitate positioning the mechanical flow assemblies 90 between an expanded position and a retraction position. That is the grooves 99 have suitable dimensions for receiving the mechanical flow assemblies 90 min the retracted position, while not obstructing the mechanical flow assemblies 90 as the mechanical flow assemblies 90 move into the expanded position. Additionally, the grooves 99 may extend a depth along a radial axis 101 that is greater than a height of the mechanical flow assemblies 90 along the radial axis 101. In this way, the centralizer 98 may block the components of the mechanical flow assemblies 90 from debris and/or other components within the wellbore 22 when the mechanical flow assemblies 90 are in the retracted position The expandable element 92, the mechanical flow assemblies 90, the piston housing 84, and the centralizer 98 are each disposed circumferentially around a mandrel 100 of the packer assembly 26. The mandrel 100 extends along an axis 102 defining a longitudinal length 104 of the packer assembly 26 and is fluidly coupled to the mechanical flow assemblies 90, and thus, the expandable element 92.

In general, one or more mechanical flow assemblies 90 (e.g., four mechanical flow assemblies 90) are positioned on opposing sides (e.g., along the longitudinal length 104) of the expandable element 92, which may facilitate uniform distribution of a flow of liquid (e.g., formation fluid and/or sampling fluid) into the expandable element 92. In the illustrated embodiment of FIG. 2, each mechanical flow assembly 90 on a particular side of the expandable element 92 are radially offset from an adjacent mechanical flow assembly 90. For example, a first mechanical flow assembly 105 is radially offset by approximately 90 degrees from a second mechanical flow assembly 106. In some embodiments, each mechanical flow assembly 90 is radially distributed uniformly (e.g., having substantially similar radially offsets) about a circumferential axis 107 of the packer assembly 26. It should be noted that the mechanical flow assembly 90 may include additional and/or fewer mechanical flow assemblies 90 than those illustrated in FIG. 2 and, as such, the radially distribution may vary based on the number of mechanical flow assemblies 90. For example, three mechanical flow assemblies 90 may be radially offset by approximately 120 degrees, four mechanical flow assemblies 90 may be radially offset by approximately 90 degrees, five mechanical flow assemblies 90 may be radially offset by approximately 72 degrees, and so forth. In other embodiments, the radial offset between the mechanical flow assemblies 90 may not be uniform (e.g., not all mechanical flow assemblies are radially offset by the same amount).

As shown in the illustrated embodiment of FIG. 2, the mechanically flow assemblies 90 are generally disposed along a similar radial position as the ports 96. That is, in the illustrated embodiment, each port 96 aligns with and corresponds to a mechanical flow assembly 90 on both sides of the expandable element 92 of the longitudinal length 104. As discussed in more detail below, two mechanical flow assemblies 90 that correspond to a respective port 96, positioned on opposite sides of the port 96, may operate cooperatively. For example, the mechanical flow assemblies 90 may both direct fluid into and/or out of the expandable element 92. Additionally or alternatively, the mechanical flow assemblies 90 may apply opposing forces against one another that drive rotation of one or more components of the mechanical flow assemblies 90.

In operation, the expandable element 92 is configured to inflate as it receives fluid from the mandrel 100 (e.g., via the mechanical flow assemblies). Additionally, the expandable element 92 is configured to deflate as fluid is drawn from the expandable element 92 toward the mandrel 100 (e.g., via opening a valve). As the expandable element 92 inflates, the mechanical flow assembly 90 is configured to move from a retracted or collapsed position (illustrated below in relationship to FIGS. 3-4) to an extended position (illustrated below in relationship to FIG. 8). The mechanical flow assembly 90 is configured to move from the extended position to the retracted or collapsed position as the expandable element deflates.

Figure 3:
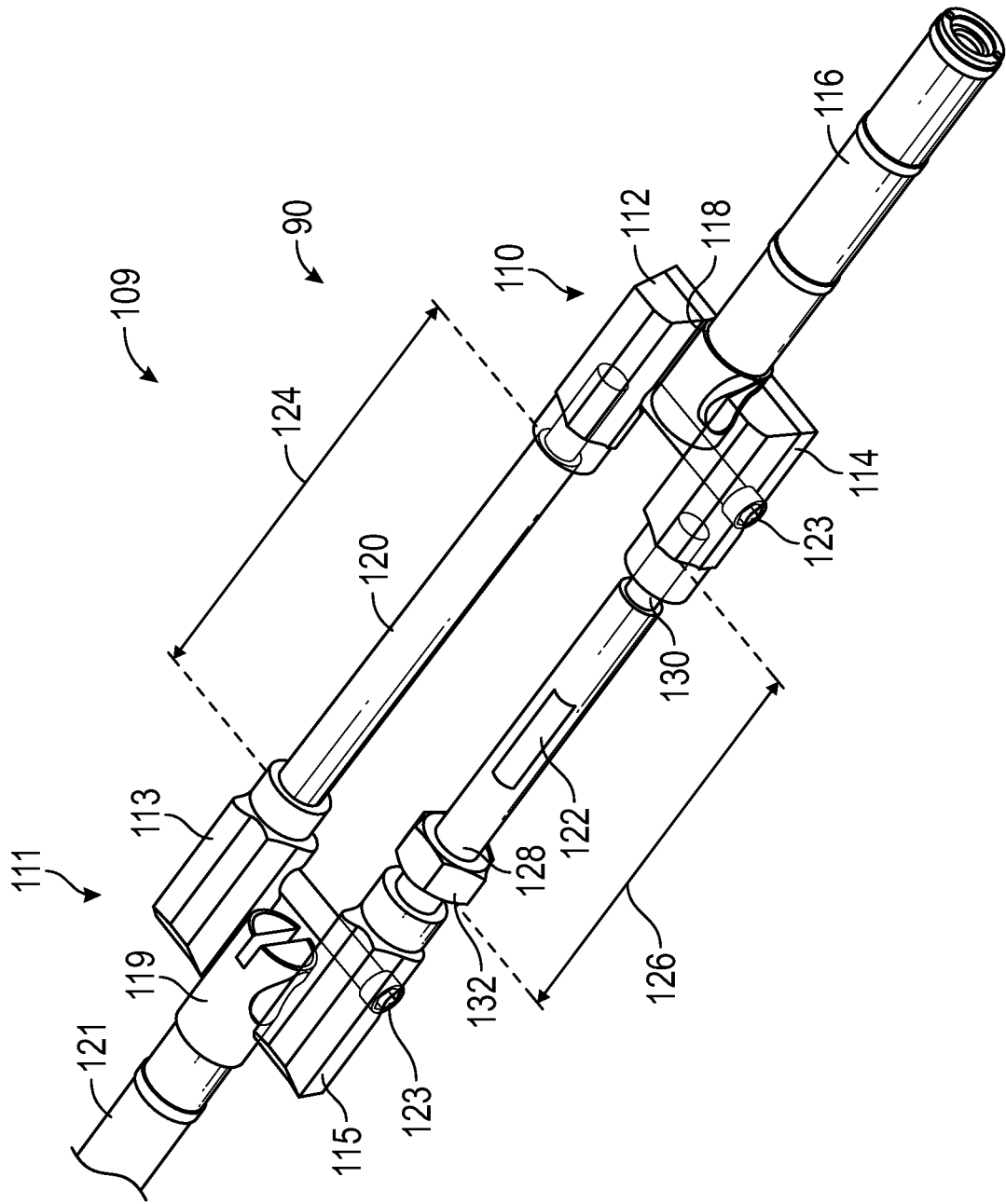
FIG. 3 is a perspective view of a mechanical flow assembly of the expandable packer of FIG. 2, in accordance with an embodiment of the present disclosure.

For example, FIG. 3 is a perspective view of the mechanical flow assembly 90 that in a retracted position 109, in accordance with an embodiment of the present disclosure. The illustrated embodiment of the mechanical flow assembly 90 of FIG. 3 includes a linkage 110 having a first linkage arm 112 and a second linkage arm 114 that are each rotatably coupled to a piston 116 via an adapter 118. While the illustrated embodiment of the mechanical flow assembly 90 includes the adapter 118, it should be noted that in some embodiments, the piston 116 may be configured to be directly coupled to the first linkage arm 112 and/or the second linkage arm 114. As shown in the illustrated embodiment of FIG. 3, the adapter 118 is mechanically coupled to the piston 116, such as by a friction interference fit, a weld, and/or a threaded connection. The first linkage arm 112 is mechanically coupled to a fluid arm 120 and the second linkage arm 114 is mechanically coupled to a support arm 122. Additionally, the mechanical flow assembly 90 includes a second linkage 111 having a first linkage arm 113 and a second linkage arm 115 that are each rotatably coupled to an adapter 119. The adapter 119 may be fluidly coupled to the expandable element 92 via a packer conduit 121, as described in more detail herein. As shown in the illustrated embodiment of FIG. 3, the first linkage arm 112 and the second linkage arm 114 and/or the first linkage arm 113 and the second linkage arm 115 are mechanically coupled to one another via a fastener 123, as discussed in more detail with regard to FIG. 4.

The fluid arm 120 includes a length 124 that extends between the linkage 110 and the linkage 111. In some embodiments, the length 124 may be adjusted, such as by controlling a degree of extension of the fluid arm 120 within the first linkage arm 112 of the linkage 110 and/or within the first linkage arm 113 of the linkage 111. For example, the fluid arm 120 may include threaded ends that facilitate mechanically coupling the fluid arm 120 to the first linkage arm 112 and to the first linkage arm 113 via rotation of the fluid arm 120. The fluid arm 120 may be rotated in order to engage one or more threads of the threaded ends with corresponding threads within the first linkage arm 112 and the first linkage arm 113. As such, the fluid arm 120 may be rotated within the first linkage arm 112 and/or the first linkage arm 113 to adjust the length 124 of the fluid arm 120. Alternatively, the fluid arm 120 may be mechanically coupled to the first linkage arms 112 and 113 via a press-fit or interference fit. In some embodiments, the fluid arm 120 may be fixedly coupled to the first linkage arms 112 and 113, such as via a weld.

The support arm 122 includes a length 126 that extends between the linkage 110 and the linkage 111. In some embodiments, the length 126 may be adjusted by varying a distance in which the support arm 122 extends into the second linkage arm 114 of the linkage 110 and/or the second linkage arm 115 of the linkage 111. For example, the support arm 122 includes threaded end portions 128 and 130 that enable the support arm 122 to be fixedly coupled to the second linkage arm 114 and the second linkage arm 115. As such, the length 126 of the support arm 122 may be adjusted by rotating the support arm 122 within a threaded portion (e.g., a recess) of the second linkage arms 114 and 115. Additionally, the support arm 122 may include a locking component 132, such as a nut, that may be rotated along the thread end portion 128 to contact the linkage 111 and, thus, tighten the locking component 132 to secure the support arm 122 to the linkage 111. In some embodiments, the length 126 of the support arm 122 is adjusted to correspond to the length 124 of the fluid arm 120. In other words, the length 126 of the support arm 122 is adjusted, such that the length 126 is substantially (e.g., within 10% of, within 5% of, or within 1% of) the length 124. Adjusting the length 126 of the support arm 122 to substantially match the length 124 of the fluid arm 120 may enable the support arm 122 to provide sufficient support to the fluid arm 120 and maintain fluid seals between the fluid arm 120 and the first linkage arms 112 and 113.

Figure 4:
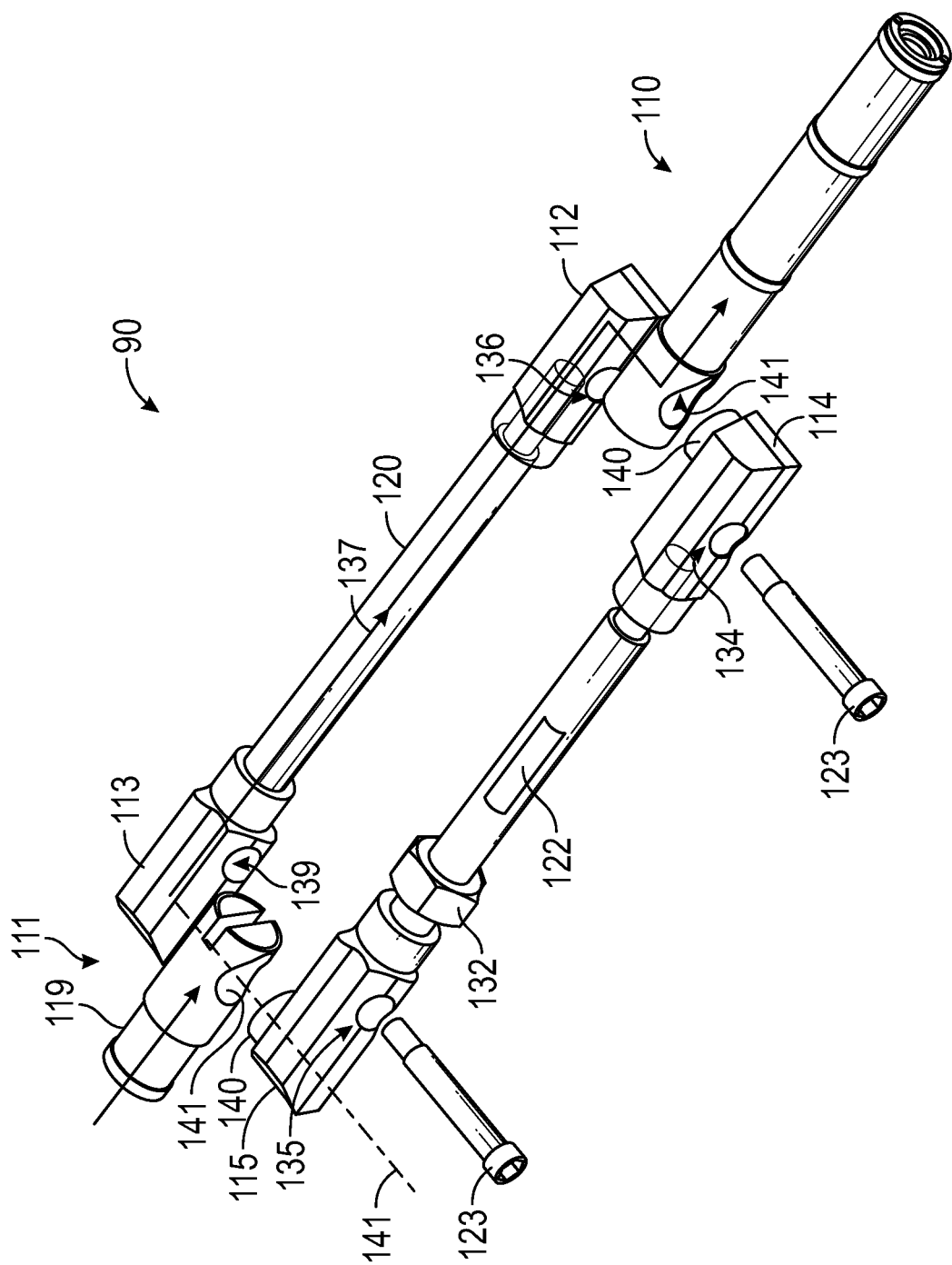
FIG. 4 is a partially exploded perspective view of the mechanic flow assembly of FIG. 3, in accordance with an embodiment of the present disclosure.

To illustrate the assembly of the mechanical flow assembly 90, FIG. 4 is a partially exploded perspective view of the mechanical flow assembly 90. In particular, the illustrated embodiment of the mechanical flow assembly 90 of FIG. 4 shows the fastener 123 (e.g., a pin, a bolt, a screw, and/or a rod) that mechanically couples the first linkage arm 112 to the second linkage arm 114 of the linkage 110 and the fastener 123 (e.g., a pin, a bolt, a screw, and/or a rod) that mechanically couples the first linkage arm 113 to the second linkage arm 115 of the linkage 111. As shown, the second linkage arms 114 and 115 each include a recess 134 and 135 that extends through the respective second linkage arms 114 and 115. Additionally, the first linkage arms 112 and 113 each include a recess 136 and 139 that partially extends (e.g., 10%, 25%, 50%, or less than 100%) through the respective first linkage arms 112 and 113, but not into a flow path 137 of the first linkage arms 112 and 113. As such, the fasteners 123 may be disposed within the recesses 134 and 135 of the second linkage arms 114 and 115 prior to being disposed within the recesses 136 and 139 of the first linkage arms 112 and 113. In this way, the recesses 136 and 139 of the first linkage arms 112 and 113 enable the first linkage arms 112 and 113 to be coupled to the second linkage arms 114 and 115, respectively, without interrupting the flow path 137 through the fluid arm 120 and/or without the use of additional sealing members (e.g., o-rings) within the first linkage arms 112 and 113.

Additionally, as shown in the illustrated embodiment of FIG. 4, the second linkage arm 115 includes a rotational element 140 that rotatably couples the second linkage arm 115 to the adapter 119. The rotational element 140 of the second linkage arm 115 may be disposed within a recess 141 (e.g., opening) of the adapter 119 to enable the second linkage arm 115 to rotate with respect to the adapter 119. Additionally, the adapter 118 may include a corresponding recess 141 (e.g., an opening) on the side corresponding to the second linkage arm 114 that enables the second linkage arm 114 to rotate with respect to the adapter 118. While not shown in the illustrated embodiment of the mechanical flow assembly 90 of FIG. 4, the linkage arms 112 and 113 may also include a respective rotational element 140. In such embodiments, the adapters 118 and 119 may also include one or more recesses 141 (e.g., openings) that, when rotatably coupled to the rotational element(s) 140 of the linkage arms 112 and/or 113, enable the linkage arms 112 and/or 113 to rotate with respect to the adapters 118 and 119.

As shown schematically within FIG. 4, the fluid arm 120 is hollow, which forms a conduit that is a portion of the flow path 137. The fluid connections between the fluid arm 120 and the first linkage arms 112 and 113 may wear over time due to the movement of the mechanical flow assembly 90. As such, the support arm 122 is included to provide additional support to the fluid arm 120 as the mechanical flow assembly 90 moves between the expanded position and the retracted position. For example, the fastener 123 mechanically couples the first linkage arms 112 and 113 to the second linkage arms 114 and 115, respectively, such that the support arm 122 is indirectly coupled to the fluid arm 120. Accordingly, the support arm 122 may bear at least a portion of stress that may be incident on the fluid arm 120 during operation. The support arm 122 may include a generally solid (e.g., not hollow) component that may withstand the forces incurred on the mechanical flow assembly 90 to provide the additional support to the fluid arm 120.

As discussed above, the support arm 122 and/or the fluid arm 120 may have an adjustable length. To better illustrate this feature, FIGS. 5, 6, 7, 8, 9, and 10 each generally illustrate cross-sectional views of an embodiment of the support arm 122 of the mechanical flow assembly 90. FIGS. 5-10 illustrate a sequence of positions of the support arm 122 as the length 126 (e.g., distance of the support arm 122 between the linkage 110 and the linkage 111) of the support arm 122 is adjusted during assembly of the mechanical flow assembly 90. As described in detail below, a user, an operator, or a machine (e.g., controlled by a controller) may rotate adjustable end portions 138 and 145 of the support arm 122 about the longitudinal axis 102 to adjust the position of the adjustable end portions 138 and 145 within threaded end portions 142 and 143 of the second linkage arms 114 and 115, respectively, to adjust the length 126 of the support arm 122. In some cases, the fluid arm 120 is fixedly coupled to the first linkage arms 112 and 113 before the support arm 122 is coupled to the second linkage arms 114 and 115. The process for adjusting the length 126 of the support arm 122 may enable the support arm 122 to be coupled to the second linkage arms 114 and 115 as well as enable the length 126 of the support arm 122 to be adjusted despite the fluid arm 120 being in a fixed position at a fixed length 124. In some embodiments, a first adjustable end portion 138 of the support arm 122 and/or the fluid arm 120 may be used for coarse adjustments of the length 126 and a second adjustable end portion 145 may be used for fine adjustments of the length 126. For example, a pitch of threads on the first adjustable end portion 138 may be relatively larger than a pitch of threads on the second adjustable end portion 145. As such, the first adjustable end portion 138 may be used for coarse adjustment of the length 126 by rotating (e.g., clockwise or counter-clockwise about the longitudinal axis 102) the support arm 122, such that the first adjustable end portion 138 moves into or out of the threaded end portion 142 of the second linkage arm 114. Likewise, the adjustable end portion 145 may be used for fine adjustment of the length 126 by rotating the support arm 122, such that the second end portion 145 moves into or out of the threaded end portion 143 of the second linkage arm 115.

Figure 5:
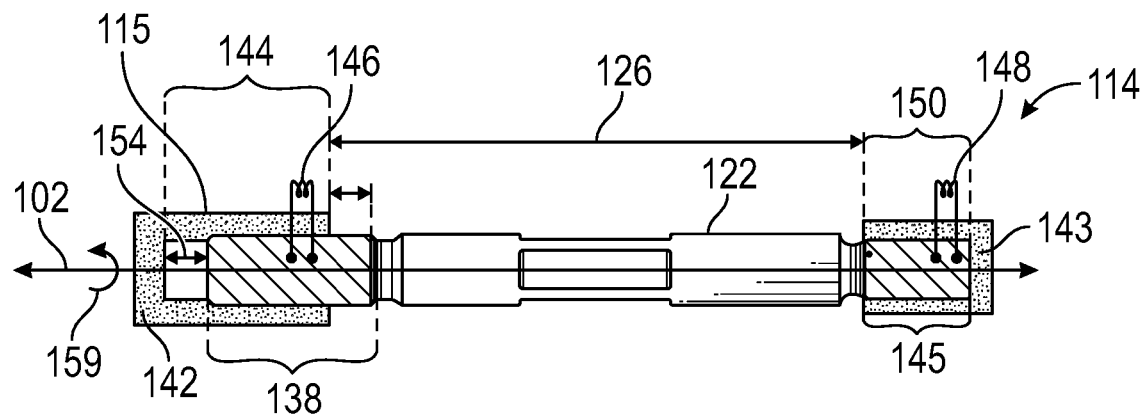
FIG. 5 is a cross-sectional view of a support arm of a mechanical flow assembly taken along a longitudinal axis of the mechanical flow assembly, where the support arm is at a first position during an assembly process, in accordance with an embodiment of the present disclosure.

FIG. 5 shows a longitudinal cross-section of the support arm 122 coupled to the linkages 110 and 111 of the mechanical flow assembly 90. For example, the first adjustable end portion 138 is disposed within a recess 144 formed into the threaded end portion 142 of the second linkage arm 115 and the second adjustable end portion 145 is disposed within a recess 150 formed into the threaded portion 143 of the second linkage arm 114. Rotation of the first adjustable end portion 138 within the recess 144 enables the length 126 of the support arm 122 to be adjusted. As shown in the illustrated embodiment of FIG. 5, threads of the first adjustable end portion 138 include a pitch 146 that is relatively larger than a pitch 148 of threads of the second adjustable end portion 145. As discussed above, the difference between the pitch 146 and the pitch 148 may enable the length 126 to be adjusted by a coarse amount (e.g., a relatively large amount) and a fine amount (e.g., a relatively small amount) via rotation of the support arm 122.

In some embodiments, the support arm 122 is coupled to the second linkage arm 114 and the second linkage arm 115 before the second linkage arm 114 is coupled to the adapter 118 and before the second linkage arm 115 is coupled to the adapter 119. Accordingly, the length 126 of the support arm 122 may be adjusted to a target length (e.g., the length 124) to align the second linkage arm 114 and the second linkage arm 115 with corresponding openings and/or receptacles of the adapter 118 and the adapter 119, respectively. The support arm 122 shown in FIG. 5 is in a first position during an assembly process of the mechanical flow assembly 90. For example, the first adjustable end portion 138 is positioned a first distance 154 from an interior wall 155 of the second linkage arm 115.

Figure 6:
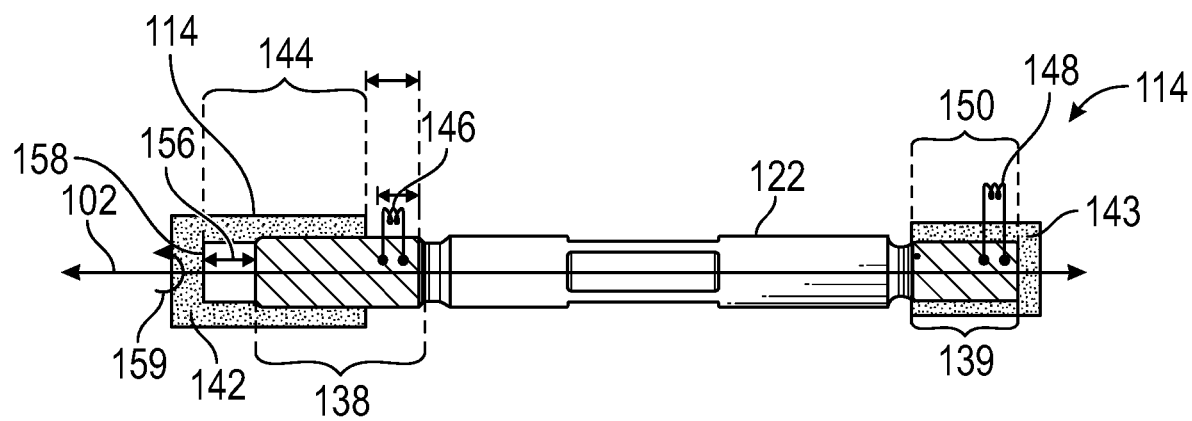
FIG. 6 is a cross-sectional view of the support arm of the mechanical flow assembly taken along the longitudinal axis of the mechanical flow assembly, where the support arm is at a second position during the assembly process, in accordance with an embodiment of the present disclosure.

FIG. 6 shows a longitudinal cross-sectional view of the support arm 122 coupled to the linkage 110 and the linkage 111 of the mechanical flow assembly 90 in a second position during the assembly process. In FIG. 6, the first adjustable end portion 138 of the support arm 122 is positioned within the recess 144 of the second linkage arm 115 at a distance 156 from the interior wall 155 of the second linkage arm 115. For example, the support arm 122 is rotated about the axis 102 in a direction 159 with respect to the second linkage arm 115 to remove at least a portion of the support arm 122 from the recess 144 and to increase the length 126. Accordingly, the support arm 122 moves from the first position shown in FIG. 5 to the second position shown in FIG. 6. In some cases, the length 126 may be shortened in order to enable the second linkage arm 114 and the second linkage arm 115 to be aligned with the corresponding openings of the adapter 118 and the adapter 119, respectively.

Figure 7:
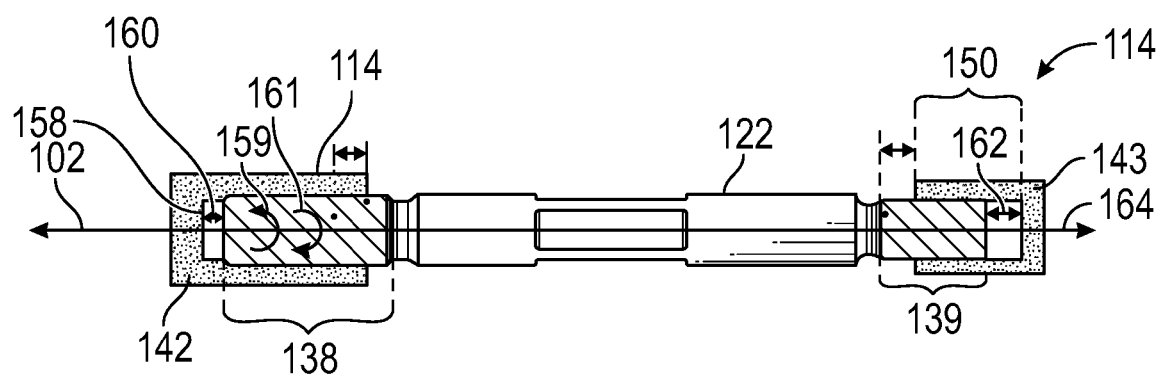
FIG. 7 is a cross-sectional view of the support arm of the mechanical flow assembly taken along the lateral axis of the mechanical flow assembly, where the support arm is at a third position during the assembly process, in accordance with an embodiment of the present disclosure.

As such, FIG. 7 is a longitudinal cross-section of the support arm 122 coupled to the linkage 110 and the linkage 111 of the mechanical flow assembly 90 in a third position. In FIG. 7, the first adjustable end portion 138 of the support arm 122 is rotated in a second direction 161 about the axis 102 to drive movement of the first adjustable end portion 138 into the recess 144. Accordingly, the first adjustable end portion 138 is disposed within the recess 144 at a third distance 160 from the interior wall 155 of the second linkage arm 115, where the third distance 160 is less than the second distance 156. Additionally, in FIG. 7, the second adjustable end portion 145 of the support arm 122 is directed outward from the recess 150 of the second linkage arm 114, such that the second adjustable end portion 145 is positioned a distance 162 from an interior wall 164 of the second linkage arm 114. As set forth above, the difference between the pitch 146 and 148 enables the first adjustable end portion 138 to move a greater distance within the recess 144 than a distance in which the second adjustable end portion 145 moves outwardly from the recess 150. As such, the length 126 of the support arm 122 may be reduced. It should be recognized that because the second linkage arm 114 and the second linkage arm 115 may not be coupled to the adapter 118 and the adapter 119, respectively, the second linkage arm 114 and the second linkage arm 115 may be separately rotated about the first adjustable end portion 138 and the second adjustable end portion 145 of the support arm 122. Accordingly, first adjustable end portion 138 may be disposed a target distance within the recess 144 independently of a distance between the second adjustable end portion 145 and the interior wall 164 within the recess 150. Thus, the length 126 of the support arm 122 may be set by rotating the support arm 122, the second linkage arm 114, and/or the second linkage arm 115, such that the second linkage arm 114 and the second linkage arm 115 align with the corresponding openings of the adapter 118 and the adapter 119, respectively.

Figure 8:
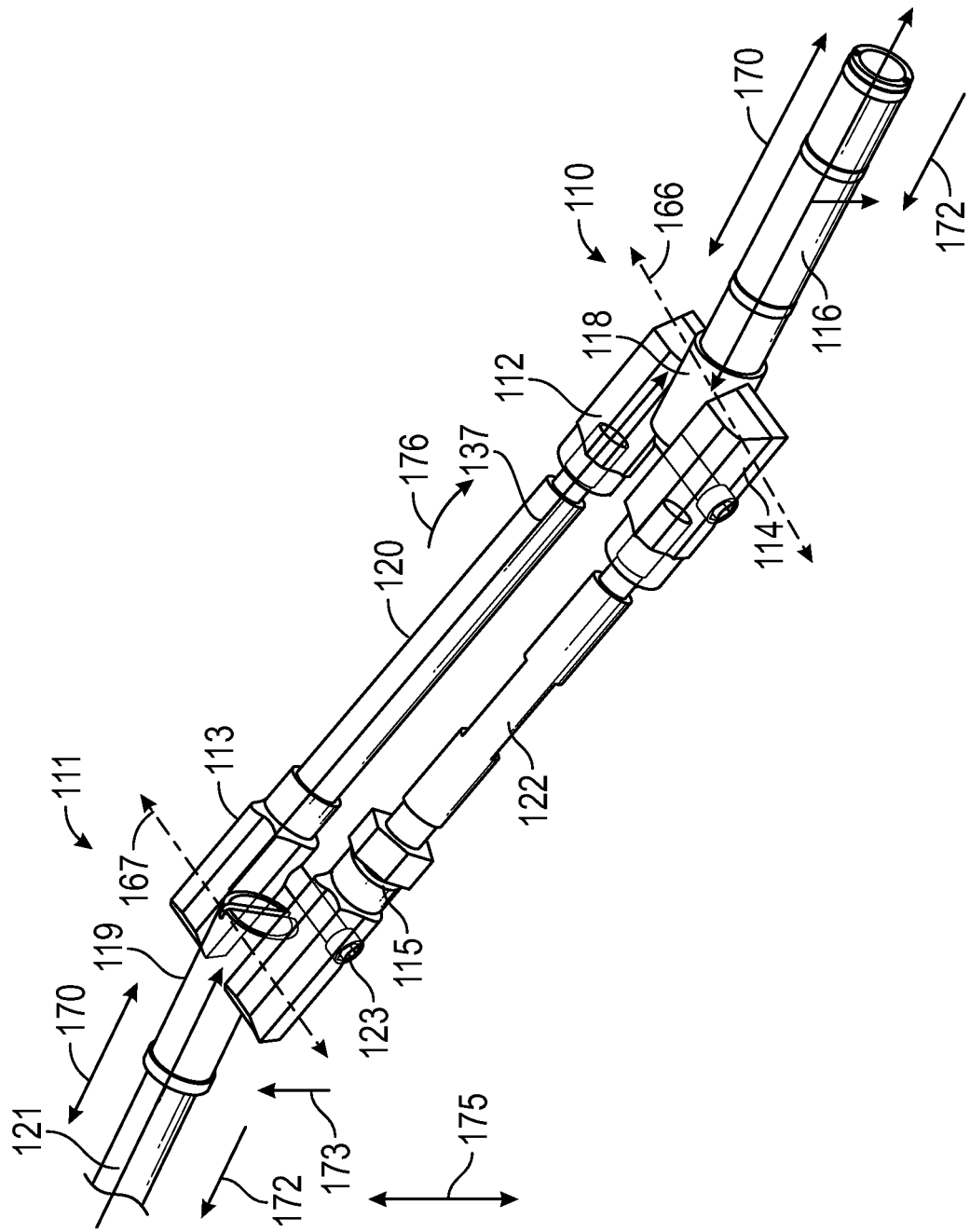
FIG. 8 is a perspective view of the mechanical flow assembly of FIG. 4 in an operating position, in accordance with an embodiment of the present disclosure.

To further illustrate operation of the mechanical flow assembly 90 after being assembled, FIG. 8 is a perspective view of the mechanical flow assembly 90 in an operating position (e.g., extended position), in accordance with an embodiment of the present disclosure. As discussed above, the linkages 110 and 111 are rotatably coupled to the piston 116. More specifically, the linkages 110 and 111 may include the adapters 118 and 119, respectively, which are mechanically coupled to the piston 116 and the packer conduit 121. The adapter 118 is rotatably coupled (e.g., about an axis 166) to the first linkage arm 112 and the second linkage arm 114, such as via a pivot connection. Similarly, the adapter 119 is rotatably coupled (e.g., about an axis 167) to the first linkage arm 113 and the second linkage arm 115 via a rotational element (e.g., the rotational element 140 shown in FIG. 4), such as a pivot connection. Additionally, the fluid arm 120 is fluidly coupled to the first linkage arm 112 of the linkage 110 and the first linkage arm 113 of the linkage 111. As described herein, the linkage 111 may be fluidly coupled to the expandable element 92, such as via the packer conduit 121. Accordingly, when the mechanical flow assembly 90 is assembled (e.g., as shown in FIG. 3), the flow path 137 enables fluid to flow between the expandable element 92, the first linkage arm 113 of the linkage 111, the fluid arm 120, the first linkage arm 112 of the linkage 110, the adapter 118, and the mandrel 100. Furthermore, as described herein, the expandable element 92 inflates in response to receiving fluid, such as from the flow path 137. Likewise, the expandable element 92 deflates in response to fluid flowing out of the expandable element 92 toward the mandrel along the flow path 137. As described in more detail below, as the expansion element 92 inflates or deflates, the piston 116 moves in an axial direction along an axis 170, which causes components of the mechanical flow assembly 90 to rotate and thus move between an expanded position and a retracted position.

More specifically, when the expandable element 92 inflates, the piston 116 may impart a first force 172 along the axis 170 and the expandable element 92 may impart a second force 173 along an axis 175 to the linkages 110 and 111. In response to the forces 172 and 173, the linkage 110 imparts a force 174 to the piston 116 along the axis 170. As the forces 172, 173, and 174 are applied, the fluid arm 120 and the support arm 122 will rotate about the axes 166 and 167 (e.g., via the first linkage arms 112 and 113 and the second linkage arms 114 and 115), causing the fluid arm 120 and the support arm 122 to rotate in a circumferential direction 176 as the expandable element 92 inflates. It should be noted that, fluid flow may still flow along the flow path 137 during rotation of the fluid arm 120 and support arm 122. In some cases, rotation about the axes 166 and 167 and the forces 172, 173, and 174 may impart stress forces to the mechanical flow assembly 90. The fasteners 123 may transfer at least a portion of the stress forces applied to the fluid arm 120 to the support arm 122. In this way, the mechanical flow assembly 90 may continue to permit flow of fluid to and from the expandable element 92, while reducing the stress forces that may wear seals and/or connections of the mechanical flow assembly 90. Although described in the context of inflation of the expandable element 92, it should be noted that the forces 172, 173, and 174 may be in an opposite direction during deflation of the expandable element 92.

Figure 9:
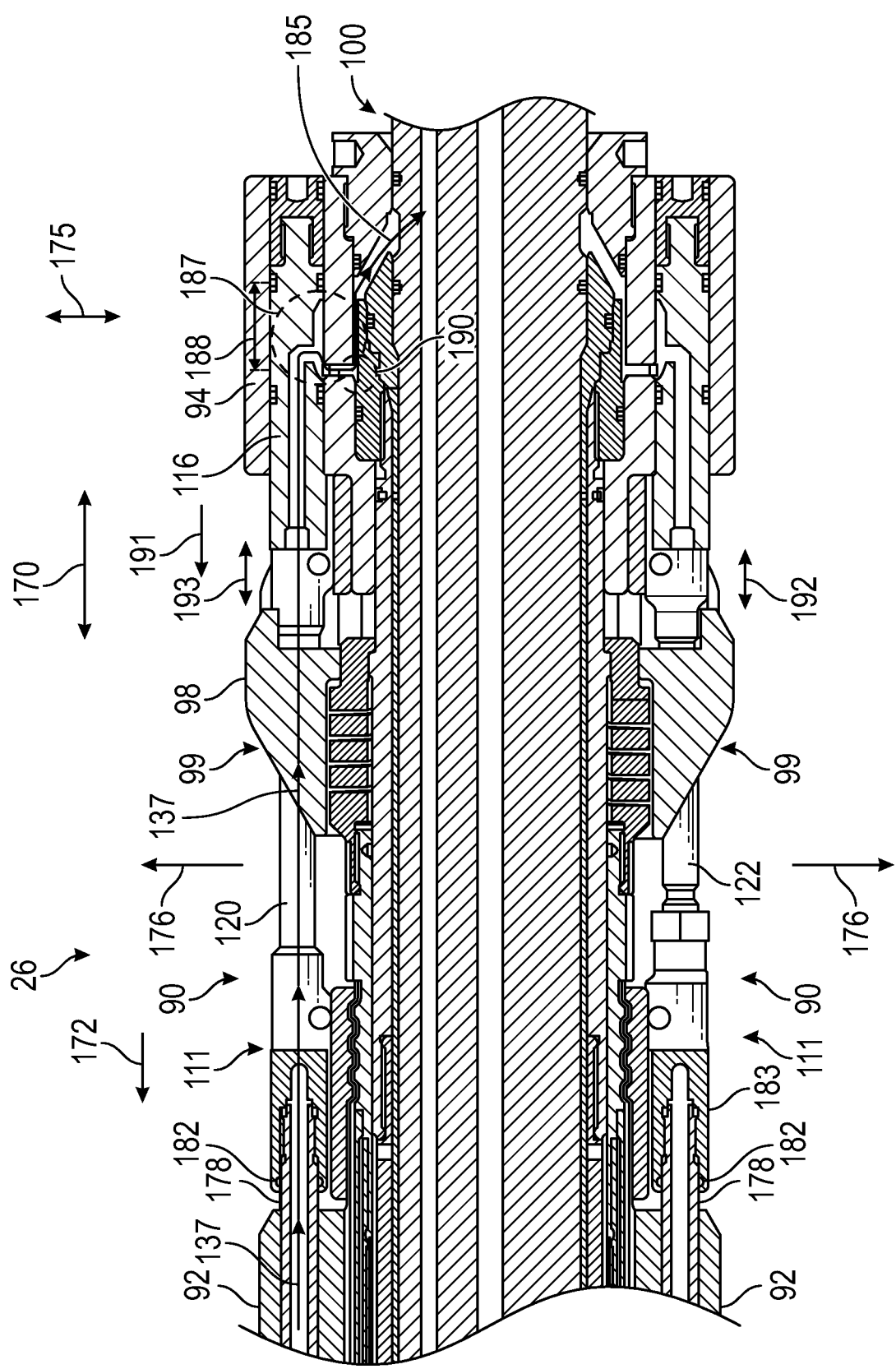
FIG. 9 is a cross-sectional view of the expandable packer and the mechanical flow assembly, in accordance with an embodiment of the present disclosure.

To better illustrate the flow path 137, FIG. 9 is a cross-section of the packer assembly 26, in accordance with an embodiment of the present disclosure. The illustrated embodiment of the packer assembly 26 includes the expandable element 92 fluidly coupled to the mechanical flow assemblies 90 via packer conduits 178. The packer conduits 178 are fluidly coupled to a respective mechanical flow assembly 90 via the linkages 111. As shown, seals 182 (e.g., o-rings) are disposed circumferentially around the packer conduit 178 within the adapter 119, and thus, create a fluid seal between the packer conduit 178 and the linkages 111. In some embodiments, the seals 182 may not be positioned at a portion 183 of the mechanical flow assembly 90 proximate to the pivot connection of the linkages 111. Thus, the stress force applied to the seals 182 resulting from the motion of the mechanical flow assembly 90 is reduced.

Fluid flowing along the flow path 137 may enter the mandrel 100 from the packer element 92 via a port 187 extending through the piston 116. In some embodiments, the port 187 extends a length 188 that enables fluid communication between the port 187 and the mandrel 100 as the piston 116 moves along the axis 170. As described above, the mechanical flow assembly 90 may extend and retract in response to inflation and deflation, respectively, of the expandable element 92. For example, inflation of the expandable element 92 causes the linkage 111 to move in a radial direction (e.g., along axis 175) due to the force 173, which causes the fluid arm 120 and the support arm 122 to rotate in the circumferential direction 176. Further, the linkage 110 rotates and moves axially in the direction of the force 172, thereby causing the piston 116 to move in a direction 191 along the axis 170 within the housing 84. In some embodiments, the linkage 111 also moves axially in the direction 191 of the force 172 in addition to movement along the radial axis 175. As the piston 116 moves, the port 187 also moves in the direction 191 of the force 172. In particular, the port 187 is fluidly coupled to a channel 190 (e.g., formed within the mandrel 100 and/or the piston housing 84). The length 188 of the port 187 is suitable such that the recess portion 187 is fluidly coupled to the channel 190 as the piston 116 moves within the housing 84 in response to the mechanical flow assembly 90 transitioning between the retracted position and the extended position. In this way, the port 187 provides a constant flow path for the fluid to flow between the expandable element 92 and the mandrel 100, such that there is little to no dead volume of fluid along the flow path 137.

As shown in the illustrated embodiment of FIG. 9, the mechanical flow assemblies 90 are disposed within the grooves 99 of the centralizer 98. The centralizer 98 generally includes the grooves 99 that receive one or more components of the mechanical flow assemblies 90 guide movement of the components as the mechanical flow assemblies 90 move between the extended position and the retracted position. The centralizer 98 may be positioned at a distance 192 from the piston housing 94 and/or the piston 116 to provide a tolerance for a piston stroke length 193. In this way, the centralizer 98 supports the mechanical flow assembly 90 during operation, and thus, facilitates the return of the expandable element 92 to its deflated position without obstructing movement of the piston 116.

Figure 10:
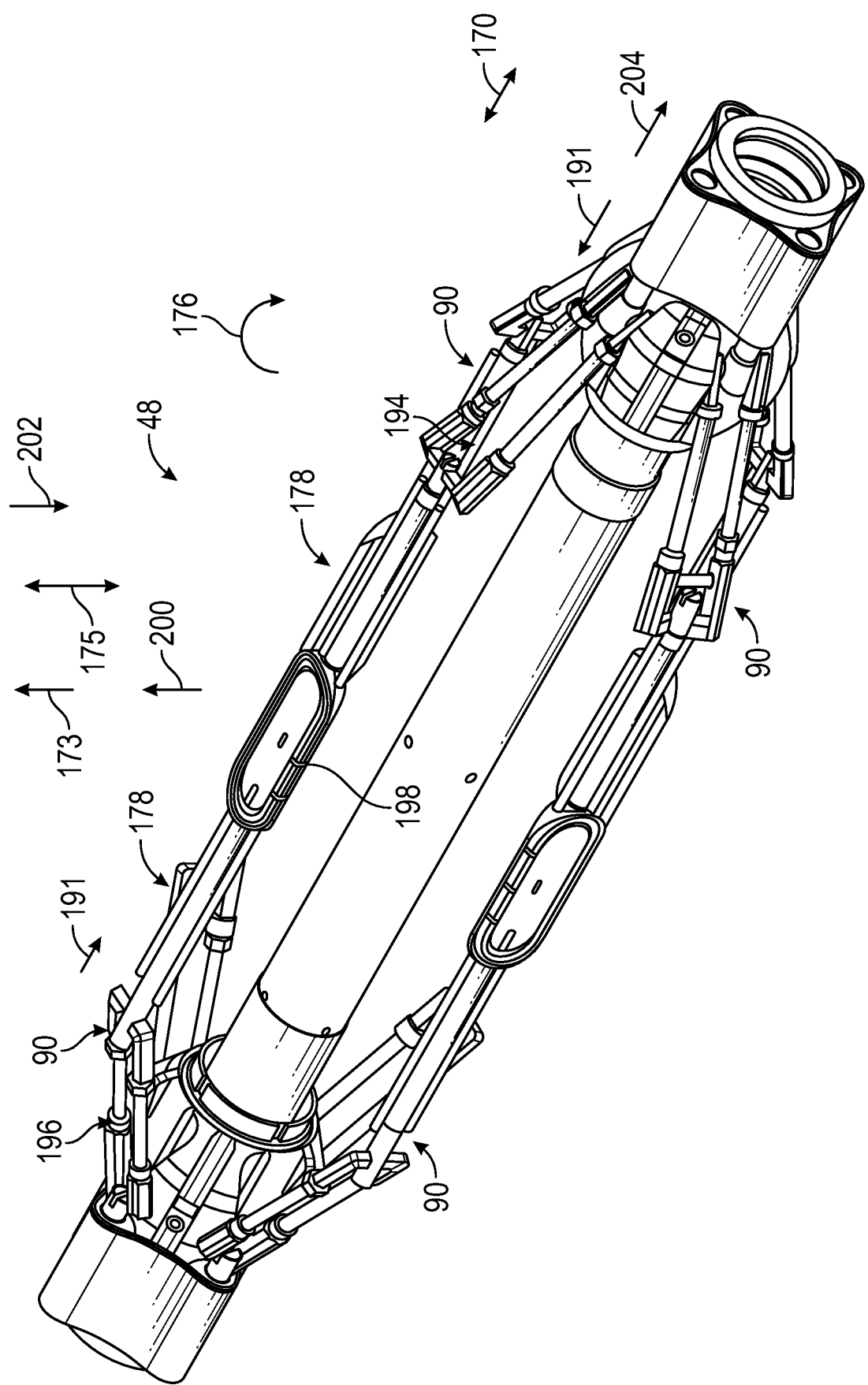
FIG. 10 shows a perspective view of the expandable packer in an operating position, in accordance with an embodiment of the present disclosure.

As discussed herein, multiple mechanical flow assemblies 90 may correspond to a port 96 of the expandable packer assembly 48. To illustrate this, FIG. 10 shows a perspective view of the expandable packer assembly 48 at an extended position, in accordance with an embodiment of the present disclosure. In the illustrated embodiment, two mechanical flow assemblies 194 and 196 correspond to the port 198. The mechanical flow assemblies 194 and 196 are fluidly coupled to the port 198 via the packer conduits 178.

More specifically, in response to inflation of the expandable element 92, and thus, movement of the expandable element 92 radially outward in a direction 200 along the axis 175, the mechanical flow assemblies 194 and 196 may each move from the retracted position to the extended position. That is, as the expandable element 92 inflates, the expandable element imparts the force 173 along the axis 175 to the linkages 111 of each of the mechanical flow assemblies 90. Movement of the mechanical flow assemblies 90 in the direction 200 drives rotation of the fluid arm 120 and the support arm 122 of the mechanical flow assemblies 90 in the circumferential direction 176 and causes the piston 116 to move in the axial direction 191. It should be noted that the axial direction 191 may be opposite for mechanical flow assemblies 90 positioned on opposite sides of the expandable element 92 with respect to the axis 170. In some embodiments, the mechanical flow assemblies 90 may include a mechanical stop element that blocks rotation of the fluid arm 120 and/or the support arm 122 as the expandable element 92 inflates. As such, movement of the mechanical flow assemblies 90 may be blocked after rotating a certain amount. The mechanical stop element may include the fasteners 123 that block rotation of the first linkage arms 112 and 113 and/or the second linkage arms 114 and 115 from rotating about the adapters 118 and/or 119 beyond a certain position. Additionally or alternatively, the piston housing 94 may include a protrusion and/or another suitable stop mechanism that blocks movement of the piston 116 within the piston housing 94 beyond a target amount. Utilizing one or more of the mechanical stop elements may reduce stress forces that may be imparted to the mechanical flow assemblies 90.

The mechanical flow assemblies 90 may similarly transition from the expanded position (e.g., shown in FIG. 10) to the retracted position (e.g., shown in FIG. 2) as fluid is directed from the expandable element 92 toward the mandrel 100 (e.g., via a pump or another suitable drive). In some embodiments, the expandable element 92 begins to deflate as fluid is directed out of the expandable element 92, thereby applying an inward radial force 202 to the linkages 111 of the mechanical flow assemblies 90. Additionally or alternatively, gravitational forces may generate the inward radial force 202 that drives the mechanical flow assemblies toward the retracted position. For example, the inward radial force 202 may cause movement of the linkages 110 and/or the pistons 116 to move in a direction 204 along the axis 170. As such, components of the mechanical flow assemblies 90 may be guided by the centralizers 98 toward the retracted position. In some embodiments, the piston 116 is disposed within the piston housing 94 in a vacuum environment that enables movement of the piston 116 to be driven by forces applied to the linkages 110 and/or 111 of the mechanical flow assemblies 90. In other words, movement of the piston 116 is not driven by pneumatic, hydraulic, electronic, and/or other mechanical forces that are applied directly to the piston 116 within the piston housing 94. The piston 116 is passively operated and its movement is guided by the inflation and deflation of the expandable element 92 triggered by pressure difference, which causes movement of the linkages 110 and 111 that ultimately drive movement of the piston 116.

Accordingly, the present disclosure relates to an expandable packer assembly that facilitates transition of an expandable element from an inflated position to a deflated position via a mechanical flow assembly. The mechanical flow assembly generally includes a support arm and a fluid arm that are each coupled to linkage arms, which are rotatably coupled to a piston, such as via an adapter. In some embodiments, the linkage arms are rotatably coupled to the adapter via a pivot connection. As the expandable element inflates, the support arm and the fluid arm rotate, and a piston may guide axial movement of the mechanical flow assembly. The centralizer is configured to shield at least a portion of the plurality of mechanical flow assemblies when the plurality of mechanical flow assemblies is in a retracted position As discussed herein, the mechanical flow assembly may facilitate returning the expandable element to the deflated position while generally maintaining a flow of fluid through the mechanical flow assembly (e.g., maintaining a flow path between the expandable element and a mandrel of the expandable packer assembly). In some embodiments, the expandable packer assembly may include a centralizer that guides movement of components of the mechanical flow assembly between an extended position and a retracted position. The centralizer may additionally or alternatively block the components of the mechanical flow assembly from debris and/or other components within the wellbore when the mechanical flow assembly is in the retracted position. In this way, the embodiments in accordance with the present disclosure improve oil and gas operations by improving the mechanical integrity of an expandable packer.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A mechanical flow assembly, comprising:
a first linkage rotatably coupled to a piston, wherein at least a portion of the first linkage is configured to flow a fluid;
a fluid arm coupled to the first linkage, wherein the fluid arm is configured to receive the fluid from the first linkage;
a second linkage coupled to the fluid arm and rotatably coupled to a packer conduit, wherein the second linkage is configured to direct the fluid from the fluid arm toward an expandable element via the packer conduit, and wherein the expandable element is configured to inflate in response to receiving the fluid; and
a support arm coupled to the first linkage and the second linkage, wherein the support arm is configured to provide support to the fluid arm in response to inflation of the expandable element.

2. The mechanical flow assembly of claim 1, comprising the piston, wherein the piston is configured to move axially with respect to a length of the expandable element in response to inflation and deflation of the expandable element.

3. The mechanical flow assembly of claim 1, wherein the fluid arm and the support arm are configured to rotate with respect to the piston and the packer conduit in response to inflation of the expandable element.

4. The mechanical flow assembly of claim 1, comprising a fastener disposed within a first stabilizer arm of the first linkage coupled to the support arm and disposed at least partially through a second stabilizer arm of the first linkage coupled to the fluid arm.

5. The mechanical flow assembly of claim 1, wherein the support arm comprises a first adjustable end portion configured to couple the support arm to the first linkage and a second adjustable end portion configured to couple the support arm to the second linkage, and wherein a length of the support arm is configured to be adjusted via the first adjustable end portion and the second adjustable end portion.

6. The mechanical flow assembly of claim 5, wherein the first adjustable end portion is configured to be disposed a first distance into a first recess of the first linkage, wherein the second adjustable end portion is configured to be disposed a second distance into a second recess of the second linkage, and wherein the first distance and the second distance are configured to be adjusted to adjust the length of the support arm.

7. The mechanical flow assembly of claim 1, wherein the first linkage is coupled to the piston via a pivot-connection and/or the second linkage is coupled to the packet conduit via a pivot connection.

8. The mechanical flow assembly of claim 1, wherein the fluid arm is fixedly coupled to the first linkage, the second linkage, or both.

9. An expandable packer assembly for a downhole tool, comprising:
an expandable element configured to inflate in response to receiving a fluid via a packer conduit and configured to deflate in response to expelling the fluid via the packer conduit; and
a mechanical flow assembly fluidly coupled to the expandable element via the packer conduit, wherein the mechanical flow assembly is configured to extend and retract in response inflation and deflation of the expandable element, respectively, wherein the mechanical flow assembly comprises:
a first linkage rotatably coupled to the packer conduit, wherein at least a portion of the first linkage is configured to flow the fluid;
a fluid arm coupled to the first linkage, wherein the fluid arm is configured to flow the fluid;
a second linkage coupled to the fluid arm and rotatably coupled to a piston, wherein at least a portion of the second linkage is configured to flow the fluid; and
a support arm coupled to the first linkage and the second linkage, wherein the support arm is configured to provide support to the fluid arm in response to inflation of the expandable element, wherein the fluid arm and the support arm are configured to rotate with respect to the piston and the packer conduit in response to the inflation of the expandable element.

10. The expandable packer assembly of claim 9, comprising an additional mechanical flow assembly fluidly coupled to the expandable element via an additional packer conduit, wherein the mechanical fluid assembly is disposed on a first side of the expandable element, and wherein the additional mechanical fluid assembly is disposed on a second side of the expandable element, opposite the first side.

11. The expandable packer assembly of claim 10, wherein the additional mechanical flow assembly comprises:
a third linkage coupled to the additional packer conduit, wherein at least a portion of the third linkage is configured to flow the fluid;
an additional fluid arm coupled to the third linkage and configured to flow the fluid; and
a fourth linkage coupled to the additional fluid arm and rotatably coupled to an additional piston, wherein at least a portion of the fourth linkage is configured to flow the fluid between the additional fluid arm and a mandrel of the expandable packer assembly.

12. The expandable packer assembly of claim 11, wherein the additional mechanical flow assembly comprises an additional support arm coupled to the third linkage and the fourth linkage, wherein the additional support arm is configured to provide support to the additional fluid arm in response to inflation of the expandable element.

13. The expandable packer assembly of claim 9, comprising the piston, wherein the piston is configured to move axially with respect to a length of the expandable element in response to inflation and deflation of the expandable element.

14. The expandable packer assembly of claim 9, wherein the support arm comprises a first adjustable end portion configured to couple the support arm to the first linkage and a second adjustable end portion configured to couple the support arm to the second linkage, and wherein a length of the support arm is configured to be adjusted via the first adjustable end portion and the second adjustable end portion.

15. An expandable packer for a downhole tool, comprising:
a mandrel configured to direct a flow of fluid;
an expandable element comprising a plurality of packer conduits, wherein the expandable element is configured to inflate in response to receiving the fluid via the plurality of packer conduits; and
a plurality of mechanical flow assemblies fluidly coupled to the mandrel and the expandable element, wherein each mechanical flow assembly of the plurality of mechanical flow assemblies comprises:
a first linkage rotatably coupled to a piston and fluidly coupled to the mandrel, wherein at least a portion of the first linkage is configured to receive the flow of fluid from the mandrel;
a fluid arm coupled to the first linkage, wherein the fluid arm is configured to receive the fluid from the first linkage;
a second linkage coupled to the fluid arm and rotatably coupled to a packer conduit of the plurality of packer conduits, wherein the second linkage is configured to direct the flow of fluid from the fluid arm toward the expandable element via the packer conduit; and
a support arm coupled to the first linkage and the second linkage, wherein the support arm is configured to provide support to the fluid arm in response to inflation of the expandable element.

16. The expandable packer of claim 15, comprising the piston, wherein the piston is configured to move axially with respect to a length of the expandable element in response to inflation and deflation of the expandable packer.

17. The expandable packer of claim 16, wherein the piston comprises a port fluidly coupled to the mandrel, wherein the port comprises a length that enables the piston to maintain a fluid connection between the second linkage and the mandrel as the piston moves axially with respect to the length of the expandable element in response to inflation and deflation of the expandable packer.

18. The expandable packer of claim 16, wherein the piston is disposed in a piston housing fluidly coupled to the mandrel, and wherein a cavity of the piston housing is at a vacuum pressure.

19. The expandable packer of claim 15, comprising a centralizer configured to shield at least a portion of the plurality of mechanical flow assemblies when the plurality of mechanical flow assemblies is in a retracted position.

20. The expandable packer of claim 15, wherein each mechanical flow assembly of the plurality of mechanical flow assemblies comprises a fastener disposed within a first stabilizer arm of the first linkage coupled to the support arm and disposed at least partially through a second stabilizer arm of the first linkage coupled to the fluid arm.

* * * * *